(12) United States Patent
Farias

(10) Patent No.: US 11,612,270 B2
(45) Date of Patent: Mar. 28, 2023

(54) COOKING UTENSIL FILL AND DRAIN TUBE APPARATUS AND METHODS OF USE

(71) Applicant: Juan B. Farias, Gilbert, AZ (US)

(72) Inventor: Juan B. Farias, Gilbert, AZ (US)

( * ) Notice: Subject to any disclaimer, the term of this patent is extended or adjusted under 35 U.S.C. 154(b) by 358 days.

(21) Appl. No.: 16/819,523

(22) Filed: Mar. 16, 2020

(65) Prior Publication Data

US 2020/0297157 A1 Sep. 24, 2020

Related U.S. Application Data

(60) Provisional application No. 62/820,620, filed on Mar. 19, 2019.

(51) Int. Cl.
*A47J 36/20* (2006.01)
*A47J 27/00* (2006.01)

(52) U.S. Cl.
CPC ............ *A47J 36/20* (2013.01); *A47J 27/002* (2013.01)

(58) Field of Classification Search
CPC .......... A47J 36/20; A47J 36/22; A47J 37/106; A47J 43/00; A47J 43/005; A47J 27/082
See application file for complete search history.

(56) References Cited

U.S. PATENT DOCUMENTS

| 4,853,509 A | * | 8/1989 | Murakami | A47J 36/027 426/243 |
| 5,199,347 A | * | 4/1993 | Chen | A47J 36/20 126/369 |
| 2016/0183710 A1 | * | 6/2016 | Wheatley | A47J 27/10 99/447 |

FOREIGN PATENT DOCUMENTS

| CN | 105411405 A | * | 3/2016 | ............ A47J 36/20 |
| CN | 105662163 A | * | 6/2016 | ............ A47J 36/20 |
| FR | 2494975 A1 | * | 6/1982 | ............ A47J 36/20 |
| KR | 20120129138 A | * | 11/2012 | ............ A47J 27/082 |
| WO | WO-2020050800 A2 | * | 3/2020 | ............ A47J 27/60 |

* cited by examiner

*Primary Examiner* — John J Norton
(74) *Attorney, Agent, or Firm* — Schmeiser, Olsen & Watts, LLP

(57) ABSTRACT

A fill and drain tube apparatus may have a drain plate with drain plate holes therethrough and at least one support bracket coupled to its lower surface for suspending the drain plate over the bottom cooking surface of a cooking utensil. A user may place food on the drain plate to allow liquids to fall through the drain plate holes to the bottom cooking surface of the cooking utensil. A drain tube having drain holes near its bottom end may extend perpendicularly through an opening in the drain plate. A user may pour liquid through the drain tube and onto the bottom cooking surface without the liquid contacting the food. The liquid may flow through the drain holes. The user may also extract liquid from the cooking utensil through the drain tube, using a ladle, or the like, without removing the food or moving or tipping the cooking utensil.

10 Claims, 5 Drawing Sheets

providing a cooking utensil having a fill and drain tube apparatus inserted therein, wherein at least one support bracket rests on a bottom cooking surface of the cooking utensil, thereby suspending a drain plate of the fill and drain tube apparatus above the bottom cooking surface of the cooking utensil, wherein the cooking utensil contains a liquid resting on the bottom cooking surface thereof

partially inserting an extraction utensil into a drain tube of the drain tube apparatus

using the extraction utensil to extract liquid from the cooking utensil through the drain tube

FIG. 5

COOKING UTENSIL FILL AND DRAIN TUBE APPARATUS AND METHODS OF USE

CROSS REFERENCE TO RELATED APPLICATION

This application claims priority to U.S. Provisional Patent Application to Juan B. Farias entitled "FILL AND DRAIN TUBE FOR COOKING UTENSILS," Ser. No. 62/820,620, filed Mar. 19, 2019, the disclosures of which are hereby incorporated entirely herein by reference.

BACKGROUND OF THE INVENTION

Technical Field

This invention relates generally to cooking utensils, and particularly to a fill and drain tube apparatus for cooking utensils.

State of the Art

When cooking, it is often necessary to drain excess grease or other liquids from a cooking utensil. Conventional pots, pans, steamers, and other similar cooking utensils often require the contents being cooked to be removed from the utensil in order to fully drain excess grease or other liquids. In addition, conventional cooking utensils require being removed from a heat source or prep area prior to draining excess grease or other liquids, causing a hazard as the cooking utensil is being moved, due to risk of a user being burned by the hot cooking utensil or contents being spilled. Furthermore, conventional cooking utensils cannot be drained of excess grease or other liquids without tipping the utensil over, sometimes causing its other contents to spill out unintentionally, causing a hazard due to risk of a user being burned, creating waste by disposing of spilled items, or dropping and/or breaking the utensil.

At other times, it is often desirable to insert grease or other liquids into a cooking utensil without causing the grease or other liquids to come into direct contact with other contents within the cooking utensil.

Accordingly, what is needed is an improved apparatus for filling and removing excess grease or other liquids from a cooking utensil.

SUMMARY OF THE INVENTION

The present invention relates to cooking utensils, and particularly to a fill and drain tube apparatus for cooking utensils.

A fill and drain tube apparatus may comprise a drain plate, having opposed upper and lower surfaces. The drain plate may comprise a plurality of drain plate holes therethrough. At least one support bracket may be coupled to the lower surface of the drain plate.

In use, the drain plate may be inserted into a cooking utensil, wherein the at least one support bracket rests on a bottom cooking surface of the cooking utensil and suspends the drain plate above the bottom cooking surface of the cooking utensil. Food may be placed to rest on the drain plate during cooking or steaming, for example, while allowing liquids to fall through the drain plate holes to the bottom cooking surface of the cooking utensil below the drain plate, to no longer be in contact with the food. A drain plate may further comprise a rim around a perimeter thereof and extending upward therefrom. In some embodiments, while in use, the drain plate may be suspended, by the at least one support bracket, above and parallel to the bottom cooking surface of the cooking utensil.

A drain plate of a fill and drain tube apparatus for cooking utensils may further comprise a drain tube aperture therethrough for receiving a drain tube partially inserted therethrough. A drain tube may comprise a tubular housing having opposed first and second open ends and defining an inner volume. The drain tube may comprise at least one drain hole through the tubular housing proximate the first open end and disposed on the same side of the drain plate as the first open end.

Methods of using a fill and drain tube apparatus for cooking utensils are also disclosed.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

FIG. 5 is a flow chart diagram of an alternative method of use of a fill and drain tube apparatus for cooking utensils, according to an embodiment.

DETAILED DESCRIPTION OF EMBODIMENTS OF THE INVENTION

As discussed above, embodiments of the present invention relate to cooking utensils, and particularly to a fill and drain tube apparatus for cooking utensils.

Figure 1:
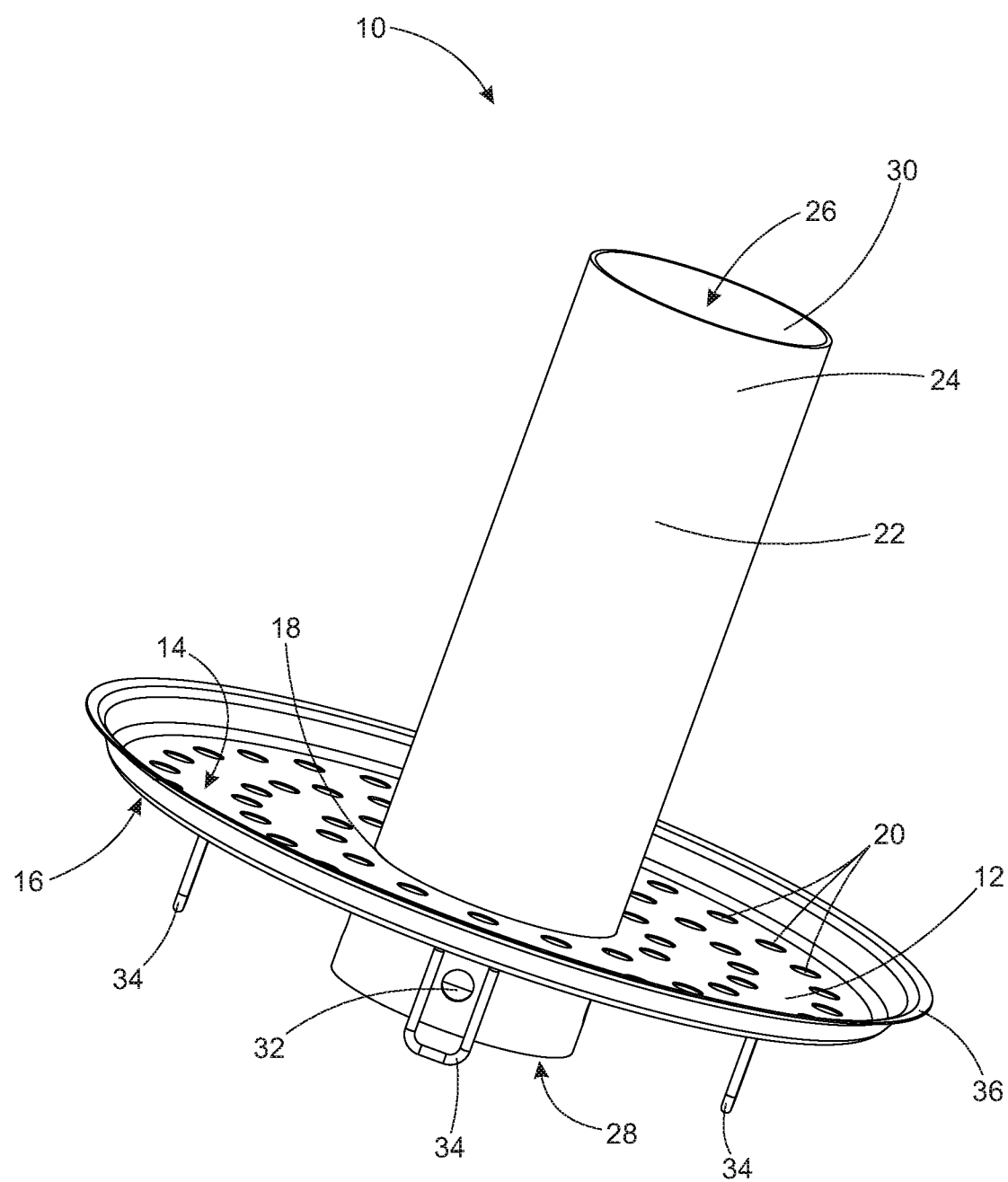
FIG. 1 is a perspective view of a fill and drain tube apparatus for cooking utensils, according to an embodiment.
Figure 2:
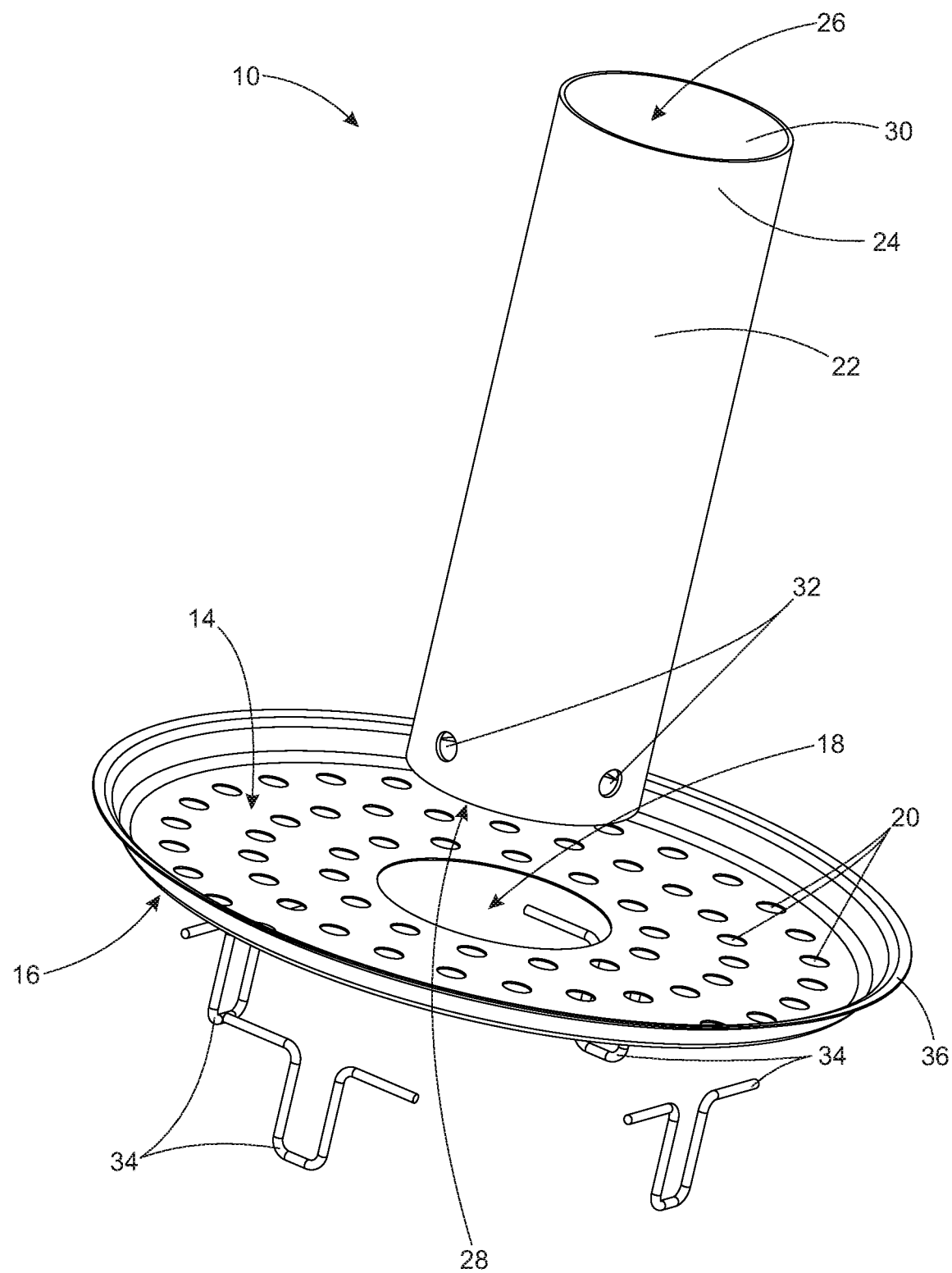
FIG. 2 is an exploded view of a fill and drain tube apparatus for cooking utensils, according to an embodiment.
Figure 3:
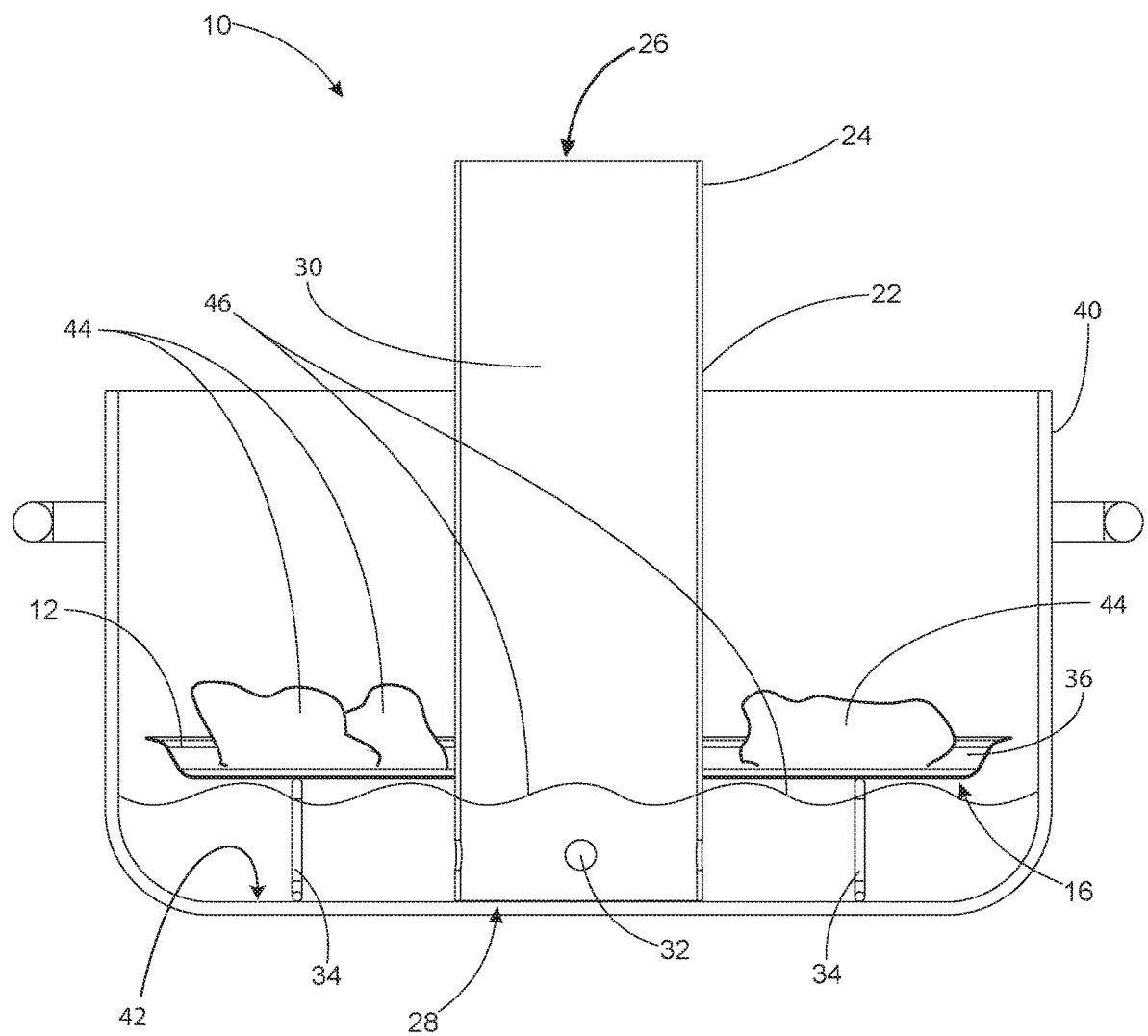
FIG. 3 is a section view of a fill and drain tube apparatus for cooking utensils, according to an embodiment, wherein the fill and drain tube apparatus is inserted into a cooking utensil.
Figure 4:
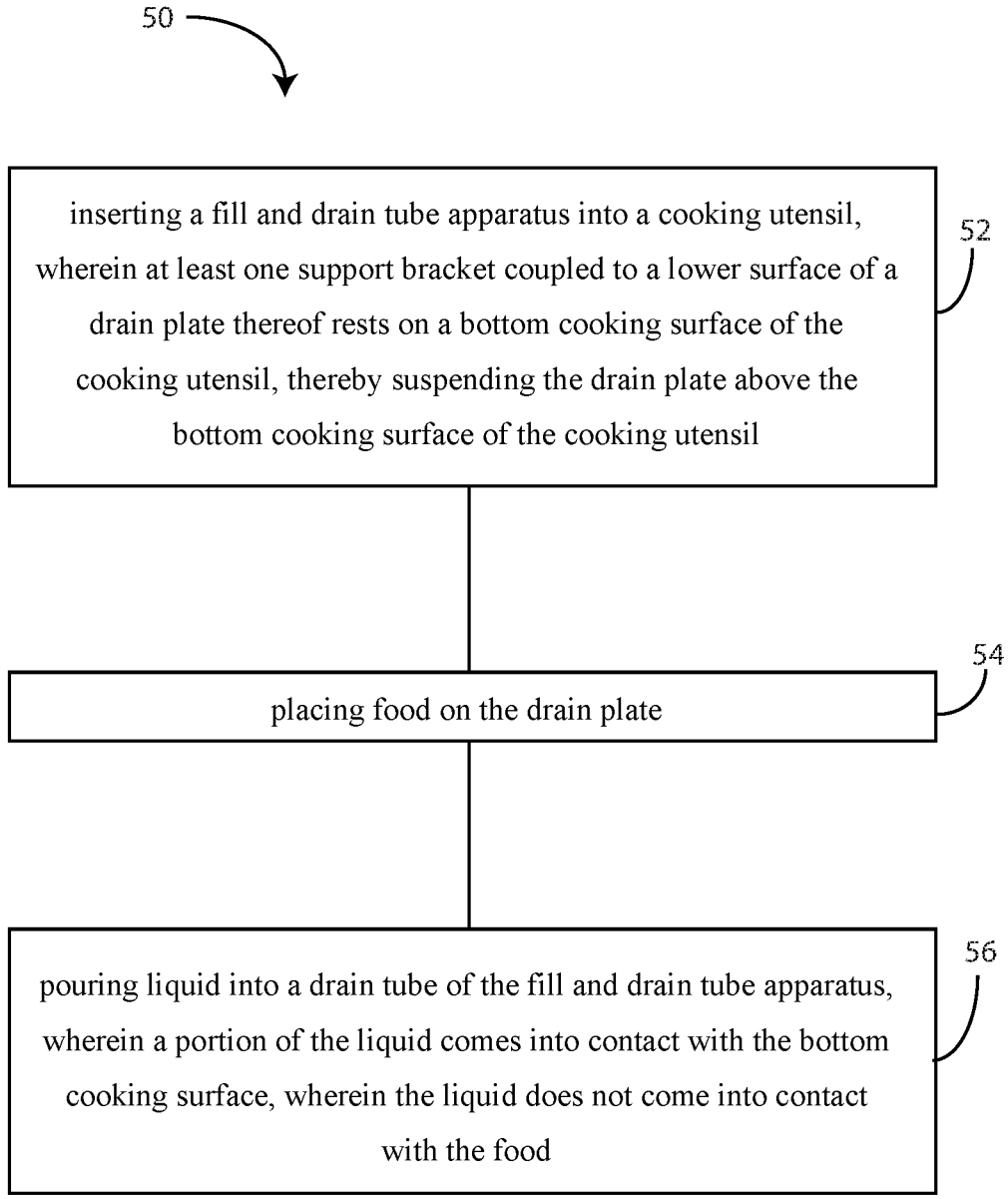
FIG. 4 is a flow chart diagram of a method of use of a fill and drain tube apparatus for cooking utensils, according to an embodiment.

Referring to the drawings, FIGS. 1-3 illustrate a fill and drain tube apparatus 10 for cooking utensils, according to an embodiment. As used in this Application, a cooking utensil 40 is any of a pot, a pan, a steamer, or the like, having a bottom cooking surface for cooking or heating foods or liquids. A fill and drain tube apparatus 10, as shown, may comprise a drain plate 12, having opposed upper and lower surfaces 14 and 16. The drain plate 12 may comprise a plurality of drain plate holes 20 therethrough. As shown in the drawings, the plurality of drain plate holes 20 may be distributed evenly in an array through the drain plate 12. At least one support bracket 34 may be coupled to the lower surface 16 of the drain plate 12.

In use, the drain plate 12 as shown in FIG. 3, having at least one support bracket 34 coupled to the lower surface 16 thereof, may be inserted into a cooking utensil 40, wherein the at least one support bracket 34 rests on a bottom cooking surface 42 of the cooking utensil 40 and suspends the drain plate 12 above the bottom cooking surface 42 of the cooking utensil 40. Food 44 may be placed on the drain plate 12 to rest on the drain plate 12 during cooking or steaming, for example, while allowing a liquid 46, such as excess grease, drippings, water, or the like, to fall from the food 44 through the plurality of drain plate holes 20 to the bottom cooking surface 42 of the cooking utensil 40 below the drain plate 12, to no longer be in contact with the food 44. In some embodiments, a drain plate 12 may further comprise a rim 36 around a perimeter thereof and extending upward therefrom. In use, a rim 36 may serve to help prevent food 44 from falling off the drain plate 12.

Although the drain plate 12, as shown in FIGS. 1-3 is circular, this is not intended to be limiting, as a drain plate 12, of the present invention, may be of any other non-circular shape consistent with the intended use of suspending food 44 thereon above a bottom cooking surface 42 of a cooking utensil 40.

The embodiment shown in FIGS. 1-3 comprises four evenly-spaced support brackets 34, each of the four support brackets 34 being formed of metal wire in a U-shape, securely coupled to the lower surface 16 of the drain plate 12. However, this is not intended to be limiting. Any number of support brackets 34, of any suitable shape, material, and configuration, or combination thereof, known to a person of ordinary skill in the art, may be utilized, so long as the number, shape, material, and configuration, or combination thereof, is consistent with the intended use of support brackets 34 to suspend a drain plate 12 above the bottom cooking surface 42 of a cooking utensil 40. In some embodiments, while in use, the drain plate 12 may be suspended, by the at least one support bracket 34, above and parallel to the bottom cooking surface 42 of the cooking utensil 40.

Furthermore, although the drain plate holes 20 of the plurality of drain plate holes 20 of the embodiment shown in FIGS. 1-3 are disposed in a configuration of three evenly-spaced circular arrays, as shown in the drawings, this is not intended to be limiting. Each of the drain plate holes 20 may be of any shape, such as, but not limited to, circular, square, or any other shape. Furthermore, the drain plate holes 20 may be of any size and disposed in any configuration, whether evenly-spaced or not, through the drain plate 12. It should be understood, however, that small particles of food 44 placed on the drain plate 12 may inadvertently fall through large drain plate holes 20. Thus, it is desirable that the drain plate holes 20 be small enough to prevent small particles of food 44 from falling through, while still allowing excess grease, drippings, water, other liquids, or the like, to fall through easily.

Referring again to the drawings, as shown in FIGS. 1-3, a drain plate 12 of a fill and drain tube apparatus 10 for cooking utensils may further comprise a drain tube aperture 18 therethrough for receiving a drain tube 22 partially inserted therethrough. A drain tube 22 may comprise a tubular housing 24 having opposed first and second open ends 26 and 28 and defining an inner volume 30. In some embodiments, the drain tube 22 may be coupled to the upper surface 14 of the drain plate 12 and extending upward therefrom, wherein the first open end 26 is aligned with and in fluid communication with the drain tube aperture 18. In some embodiments, the first open end 26 of the drain tube 22 may be inserted through the drain tube aperture 18, as shown in FIGS. 1-3. In such embodiments, the drain tube 22 may comprise at least one drain hole 32 through the tubular housing 24 proximate the first open end 26 and disposed on the same side of the drain plate 12 as the first open end 26. For example, without limitation, the drain tube 22 may comprise four drain holes 32 spaced evenly about the circumference of the drain tube 22 proximate the first open end 26 thereof, as shown in FIGS. 1-3. In some embodiments, the drain plate 12 may remain in engagement with the tubular housing 24 by friction between the drain plate 12 and the tubular housing 24, as shown in the drawings.

The disposition of the drain tube aperture 18 is not limited to that shown in FIGS. 1-3, concentric with the drain plate 12. The drain tube aperture 18 may be disposed anywhere through the drain plate 12. Furthermore, the shape of a drain tube 22 and corresponding drain tube aperture 18 is not limited to a circular shape, as shown in the drawings. A drain tube 22 and corresponding drain tube aperture 18 may be of any non-circular shape.

It is an advantage of a fill and drain tube apparatus 10 of the present invention that a user may pour liquid 46 through the drain tube 22 and onto the bottom cooking surface 42 of a cooking utensil 40 without the liquid 46 coming into contact with food 44 that may be resting on the drain plate 12. It is also an advantage of a fill and drain tube apparatus 10 of the present invention that a user may extract liquid 46 from the bottom cooking surface 42 of a cooking utensil 40 through the drain tube 22, such as by use of an extraction utensil (not shown), such as a spoon, a ladle, or the like, without the need to remove any food 44 that may be resting on the drain plate 12 and without the need to tip or move the cooking utensil 40, thereby reducing risks of spilling food 44 or liquid 46, dropping or breaking the cooking utensil 40, and burning the user by inadvertent contact with the cooking utensil 40 or its contents.

A method 50 of using a fill and drain tube apparatus may comprise: inserting a fill and drain tube apparatus into a cooking utensil, wherein at least one support bracket coupled to a lower surface of a drain plate thereof rests on a bottom cooking surface of the cooking utensil, thereby suspending the drain plate above the bottom cooking surface of the cooking utensil [Step 52]; placing food on the drain plate [Step 54]; pouring liquid into a drain tube of the fill and drain tube apparatus, wherein a portion of the liquid comes into contact with the bottom cooking surface, wherein the liquid does not come into contact with the food [Step 56]. In some embodiments of the method, a portion of the liquid may pass through at least one drain hole of the drain tube in response to pouring liquid into the drain tube. In some embodiments, the drain plate may be disposed parallel to the bottom cooking surface of the cooking utensil. In some embodiments, the drain plate may remain in engagement with the tubular housing by friction between the drain plate and the tubular housing.

Another method 60 of using a fill and drain tube apparatus may comprise: providing a cooking utensil having a fill and drain tube apparatus inserted therein, wherein at least one support bracket rests on a bottom cooking surface of the cooking utensil, thereby suspending a drain plate of the fill and drain tube apparatus above the bottom cooking surface of the cooking utensil, wherein the cooking utensil contains a liquid resting on the bottom cooking surface thereof [Step 62]; partially inserting an extraction utensil into a drain tube of the drain tube apparatus [Step 64]; and using the extraction utensil to extract liquid from the cooking utensil through the drain tube [Step 66]. In some embodiments, a portion of the liquid may pass through at least one drain hole of the drain tube in response to using the extraction utensil to extract liquid from the cooking utensil through the drain tube. In some embodiments, the drain plate is disposed parallel to the bottom cooking surface of the cooking utensil. In some embodiments, the drain plate may remain in engagement with the tubular housing by friction between the drain plate and the tubular housing.

The components defining any fill and drain tube apparatus 10 may be formed of any of many different types of materials or combinations thereof that can readily be formed into shaped objects provided that the components selected are consistent with the intended operation of a fill and drain tube apparatus 10. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any fill and drain tube apparatus 10 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A fill and drain tube apparatus, comprising:
   a drain plate, comprising:
      opposed upper and lower surfaces;
      a drain tube aperture therethrough; and
      a plurality of drain plate holes therethrough;
   a drain tube, wherein the drain plate is separable and joinable to the drain tube, the drain tube comprising:
      a tubular housing having opposed first and second open ends and defining an inner volume; and
      at least one drain hole through the tubular housing proximate the first open end, wherein the first open end is extended through the drain tube aperture, wherein the drain plate engages the tubular housing and retains the tubular housing a predetermined distance from the first end by friction between the drain plate and the tubular housing, and wherein the at least one drain hole and the first open end are disposed on a same side of the lower surface and separated from the lower surface of the drain plate; and
   at least one support bracket coupled to the lower surface, wherein the drain plate is held a distance from a bottom cooking surface of a cooking utensil in response to the drain tube and the at least one support bracket resting and contacting the bottom cooking surface of the cooking utensil.

2. The fill and drain tube apparatus of claim 1, wherein the drain plate further comprises:
   a rim around a perimeter thereof and extending upward therefrom.

3. The fill and drain tube apparatus of claim 1, wherein the drain plate is configured to be suspended parallel to the bottom cooking surface of the cooking utensil.

4. A method of using a fill and drain tube apparatus, comprising:
   providing a fill and drain tube apparatus, comprising:
      a drain plate, comprising:
         opposed upper and lower surfaces;
         a drain tube aperture therethrough; and
         a plurality of drain plate holes therethrough;
      a drain tube, wherein the drain plate is separable and joinable to the drain tube, the drain tube comprising:
         a tubular housing having opposed first and second open ends and defining an inner volume; and
         at least one drain hole through the tubular housing proximate the first open end, wherein the first open end is extended through the drain tube aperture, wherein the drain plate engages the tubular housing and retains the tubular housing a predetermined distance from the first end by friction between the drain plate and the tubular housing, and wherein the at least one drain hole and the first open end are disposed on a same side of the lower surface and separated from the lower surface of the drain plate; and
      at least one support bracket coupled to the lower surface;
   inserting the fill and drain tube apparatus into a cooking utensil, wherein the first open end of the tubular housing of the drain tube and the at least one support bracket coupled to the lower surface of the drain plate thereof rests on a bottom cooking surface of the cooking utensil, thereby suspending the drain plate above the bottom cooking surface of the cooking utensil;
   placing food on the drain plate;
   pouring liquid into the drain tube of the fill and drain tube apparatus, wherein a portion of the liquid comes into contact with the bottom cooking surface.

5. The method of claim 4, wherein the liquid does not come into contact with the food.

6. The method of claim 4, wherein a portion of the liquid passes through the at least one drain hole of the drain tube in response to pouring liquid into the drain tube.

7. The method of claim 6, wherein the drain plate is disposed parallel to the bottom cooking surface of the cooking utensil.

8. A method of using a fill and drain tube apparatus, comprising:
providing a fill and drain tube apparatus, comprising:
a drain plate, comprising:
opposed upper and lower surfaces;
a drain tube aperture therethrough; and
a plurality of drain plate holes therethrough;
a drain tube, wherein the drain plate is separable and joinable to the drain tube, the drain tube comprising:
a tubular housing having opposed first and second open ends and defining an inner volume; and
at least one drain hole through the tubular housing proximate the first open end, wherein the first open end is extended through the drain tube aperture, wherein the drain plate engages the tubular housing and retains the tubular housing a predetermined distance from the first end by friction between the drain plate and the tubular housing, and wherein the at least one drain hole and the first open end are disposed on a same side of the lower surface and separated from the lower surface of the drain plate; and
at least one support bracket coupled to the lower surface;
providing a cooking utensil having the fill and drain tube apparatus inserted therein, wherein the first open end of the tubular housing of the drain tube and the at least one support bracket rests on a bottom cooking surface of the cooking utensil, thereby suspending the drain plate of the fill and drain tube apparatus above the bottom cooking surface of the cooking utensil, wherein the cooking utensil contains a liquid resting on the bottom cooking surface thereof;
partially inserting an extraction utensil into the drain tube of the drain tube apparatus through the second open end; and
using the extraction utensil to extract liquid from the cooking utensil through the drain tube.

9. The method of claim 8, wherein a portion of the liquid passes through the at least one drain hole of the drain tube in response to using the extraction utensil to extract liquid from the cooking utensil through the drain tube.

10. The method of claim 9, wherein the drain plate is disposed parallel to the bottom cooking surface of the cooking utensil.

* * * * *